(12) United States Patent
Forristall et al.

(10) Patent No.: US 10,753,663 B2
(45) Date of Patent: Aug. 25, 2020

(54) HVAC SYSTEM WITH MULTIPLE COMPRESSORS AND HEAT EXCHANGERS

(71) Applicant: Johnson Controls Technology Company, Auburn Hills, MI (US)

(72) Inventors: Randall C. Forristall, Blanchard, OK (US); Vincent E. Ford, Norman, OK (US); Theresa T. Dinh, Oklahoma City, OK (US); Tyler S. Riddle, Newcastle, OK (US); Curtis A. Trammell, Newcastle, OK (US); Robert C. Haddad, Oklahoma City, OK (US); Anthony J. Reardon, Moore, OK (US)

(73) Assignee: Johnson Controls Technology Company, Auburn Hills, MI (US)

( * ) Notice: Subject to any disclaimer, the term of this patent is extended or adjusted under 35 U.S.C. 154(b) by 162 days.

(21) Appl. No.: 15/901,953

(22) Filed: Feb. 22, 2018

(65) Prior Publication Data
US 2019/0226738 A1   Jul. 25, 2019

Related U.S. Application Data (60) Provisional application No. 62/621,964, filed on Jan. 25, 2018.

(51) Int. Cl.
*F25B 49/02* (2006.01)
*F25B 5/02* (2006.01)
*F25B 6/02* (2006.01)

(52) U.S. Cl.
CPC .............. *F25B 49/027* (2013.01); *F25B 5/02* (2013.01); *F25B 6/02* (2013.01); *F25B 2400/06* (2013.01); *F25B 2400/075* (2013.01); *F25B 2600/0251* (2013.01); *F25B 2600/111* (2013.01); *F25B 2600/2519* (2013.01)

(58) Field of Classification Search
CPC ........ F25B 6/02; F25B 5/02; F25B 2400/075; F25B 49/027; F25B 2600/111; F25B 2600/0251
See application file for complete search history.

(56) References Cited

U.S. PATENT DOCUMENTS

| | | | | |
|---|---|---|---|---|
| 3,677,028 A | * | 7/1972 | Raymond | F25B 5/02 62/200 |
| 3,786,648 A | * | 1/1974 | Rice | F25B 5/02 62/200 |
| 5,205,130 A | * | 4/1993 | Pannell | B60H 1/00364 62/134 |
| 5,709,097 A | * | 1/1998 | Kim | F24F 3/065 62/175 |
| 6,694,765 B1 | | 2/2004 | Waldschmidt et al. | |

(Continued)

*Primary Examiner* — Frantz F Jules
*Assistant Examiner* — Lionel Nouketcha
(74) *Attorney, Agent, or Firm* — Fletcher Yoder P.C.

(57) ABSTRACT

A vapor compression system that includes a baffle that separates a first condenser and a first fan from a second condenser and a second fan. A controller that switches between first and second modes of operation. In the first mode of operation the controller closes a valve to block a flow of a refrigerant through a first condenser and turns off the first fan. In the second mode of operation the controller opens the valve to enable the flow of the refrigerant through the first condenser and turns on the first fan.

7 Claims, 6 Drawing Sheets

(56) References Cited

U.S. PATENT DOCUMENTS

| | | | |
|---|---|---|---|
| 8,813,512 B2 | 8/2014 | Rajasekaran et al. | |
| 9,599,353 B2 | 3/2017 | Cur et al. | |
| 9,726,387 B2* | 8/2017 | Karkhanis | F24F 3/1405 |
| 2006/0174640 A1* | 8/2006 | Caskey | F25B 49/027 |
| | | | 62/183 |
| 2009/0277196 A1 | 11/2009 | Gambiana et al. | |
| 2012/0273166 A1* | 11/2012 | Hatton | F24F 1/46 |
| | | | 165/104.14 |
| 2014/0020637 A1 | 1/2014 | Yamin | |
| 2016/0273814 A1* | 9/2016 | Tiranno | F25B 6/02 |

* cited by examiner

HVAC SYSTEM WITH MULTIPLE COMPRESSORS AND HEAT EXCHANGERS

CROSS-REFERENCE TO RELATED APPLICATION

This application is a Non-Provisional Application claiming priority to U.S. Provisional Application No. 62/621,964, entitled "HVAC SYSTEM WITH MULTIPLE COMPRESSORS AND HEAT EXCHANGERS," filed Jan. 25, 2018, which is hereby incorporated by reference in its entirety for all purposes.

BACKGROUND

The invention relates generally to HVAC systems.

Heating, ventilation, and air conditioning (HVAC) systems condition enclosed spaces by exchanging energy between a refrigerant and air. HVAC systems accomplish condition air supplied to the enclosed spaces by circulating a refrigerant between two heat exchangers commonly referred to as an evaporator coil and a condenser coil. As refrigerant passes through the evaporator coil and the condenser coil, the refrigerant either absorbs or discharges thermal energy from an air stream or other fluid. More specifically, as air passes over the evaporator coil, the air cools as it loses energy to the refrigerant passing through the evaporator coil. In contrast, the condenser coil enables the refrigerant to discharge heat into the atmosphere as air flows over the condenser coil.

SUMMARY

The present disclosure relates to a vapor compression system that includes a baffle that separates a first condenser and a first fan from a second condenser and a second fan. A controller that switches between first and second modes of operation. In the first mode of operation the controller closes a valve to block a flow of a refrigerant through a first condenser and turns off the first fan. In the second mode of operation the controller opens the valve to enable the flow of the refrigerant through the first condenser and turns on the first fan.

The present disclosure also relates to a vapor compression system that includes a first valve that controls a flow of a refrigerant through a first condenser. A second valve that controls the flow of the refrigerant through a second condenser. A controller that closes the first valve and opens the second valve in a first mode of operation and closes the second valve and opens the first valve in a second mode of operation.

The present disclosure also relates to a vapor compression system that includes a first fan that moves a first fluid across a first condenser and a second fan that moves a second fluid across a second condenser. A baffle disposed between the first condenser and the second condenser and between the first fan and the second fan. The baffle reduces and/or blocks mixing of the first and second fluids. A controller that switches between first and second modes of operation. In the first mode of operation the controller turns off the first fan, and in the second mode of operation the controller turns on the first fan.

DETAILED DESCRIPTION

The integrated energy efficiency ratio (IEER) is a number that represents an HVAC system's part load performance, which enables energy comparisons among similar HVAC systems. The integrated energy efficiency ratio is calculated by summing weighted energy efficiency ratios (EERs) of the HVAC system at four different operating conditions. The four different operating conditions are commonly referred to as the A, B, C, and D points. In general, the A point EER measures the energy efficiency ratio of the HVAC system operating at 100% capacity in ambient conditions of 95° F. The B point EER measures the energy efficiency ratio of the HVAC system operating at 75% capacity in ambient conditions of 81.5° F. The C point EER measures the energy efficiency ratio of the HVAC system operating at 50% capacity in ambient conditions of 68° F. Finally, the D point EER measures the energy efficiency ratio of the HVAC system operating at 25% capacity in ambient conditions of 65° F. Each of these EERs is then weighted and added together to generate the integrated energy efficiency ratio (IEER). Embodiments of the present disclosure include HVAC systems that improve the IEER by reducing power consumption at operating conditions less than full cooling capacity, for example, when a multi-compressor HVAC system operates with less than all of its compressors. In order to increase the integrated energy efficiency ratio, the HVAC systems described below include one or more valves capable of controlling the flow of refrigerant through one or more condensers. By shutting down one or more condensers, the HVAC systems are able to shut down the associated fans used to draw air over those condensers. Furthermore, the HVAC systems below may also include a baffle between the condensers and their associated fans. The baffle focuses or guides airflow drawn by one or more fans over the operating condenser, which increases heat rejection from the operating condenser(s) and thus the overall efficiency of the HVAC system.

Figure 1:
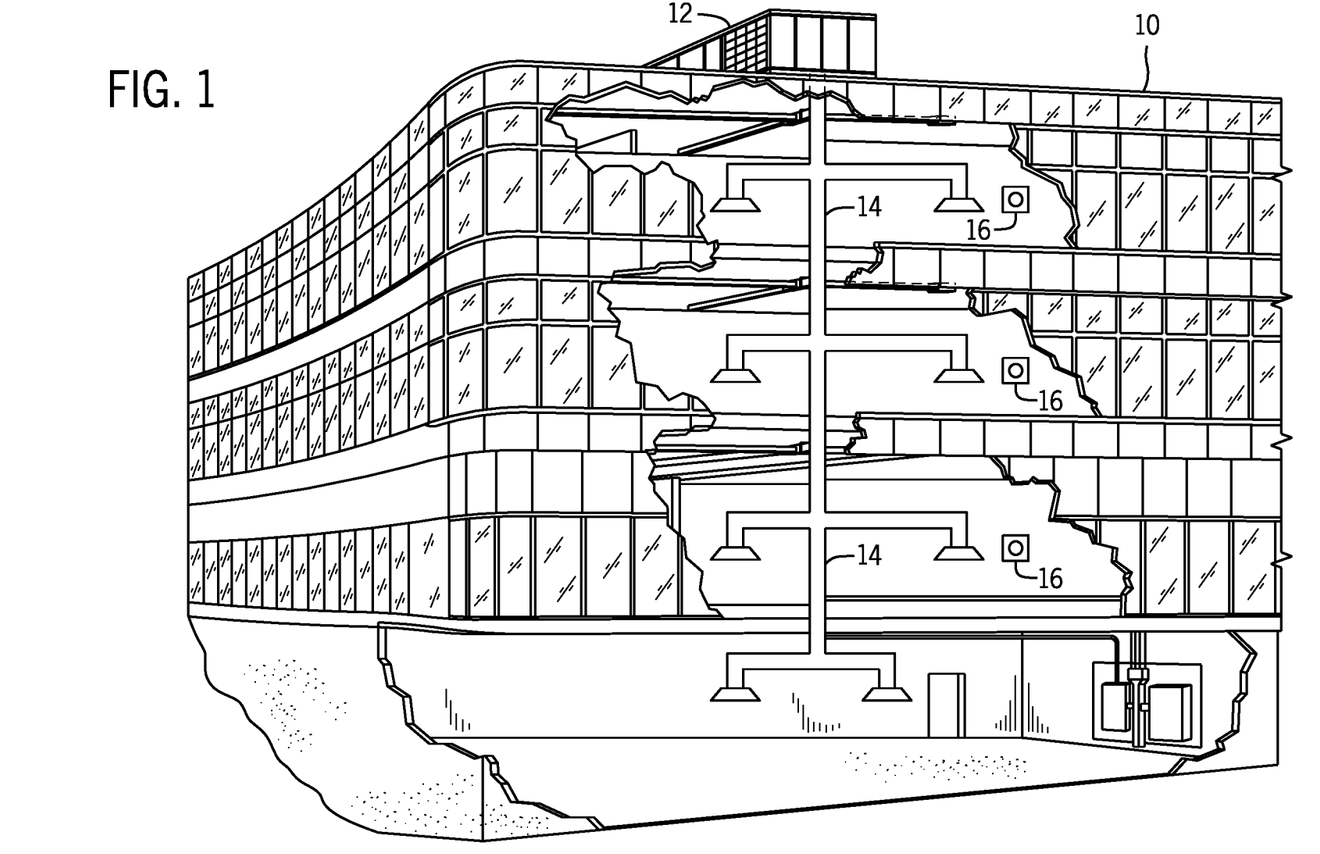
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
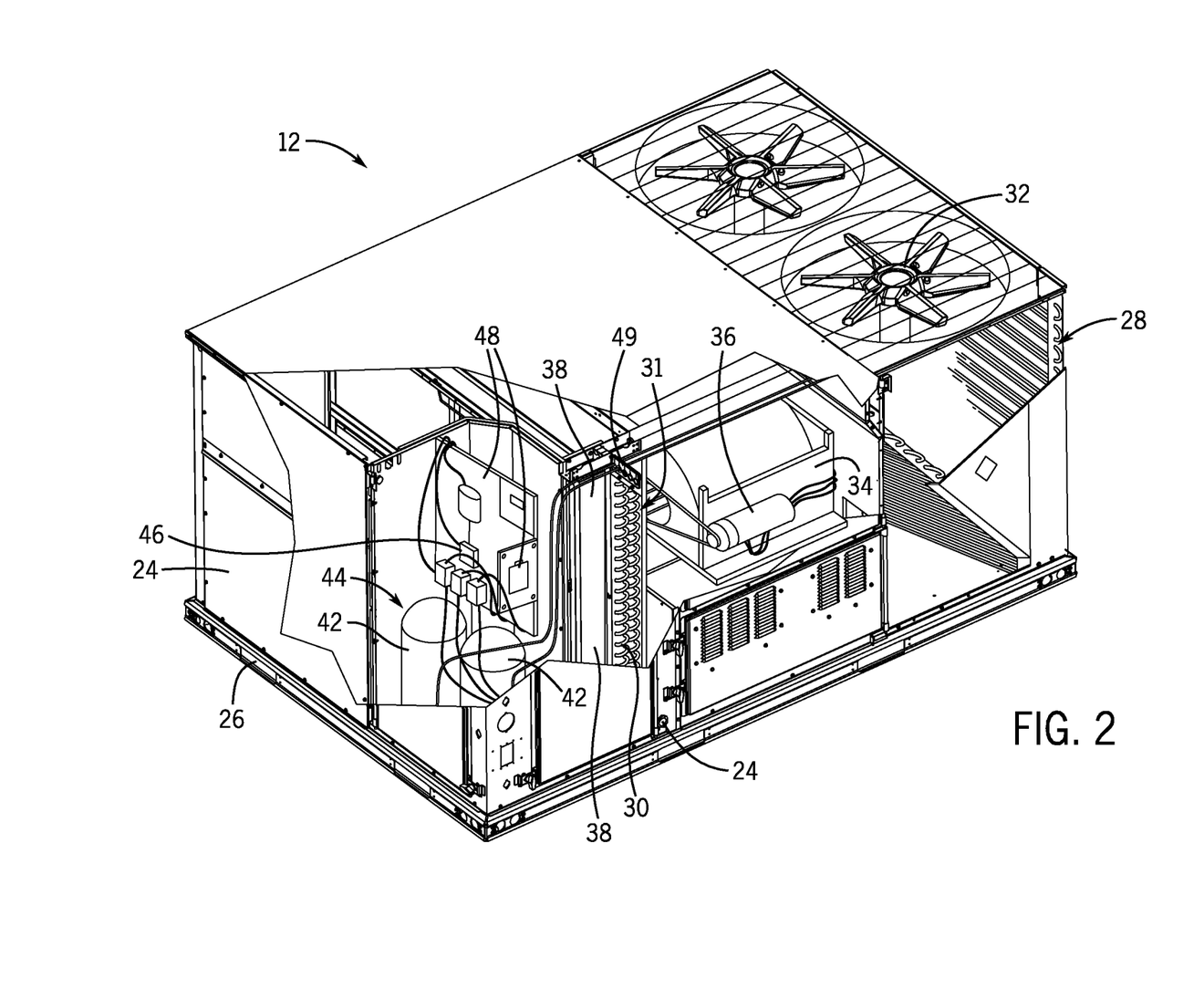
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive him arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
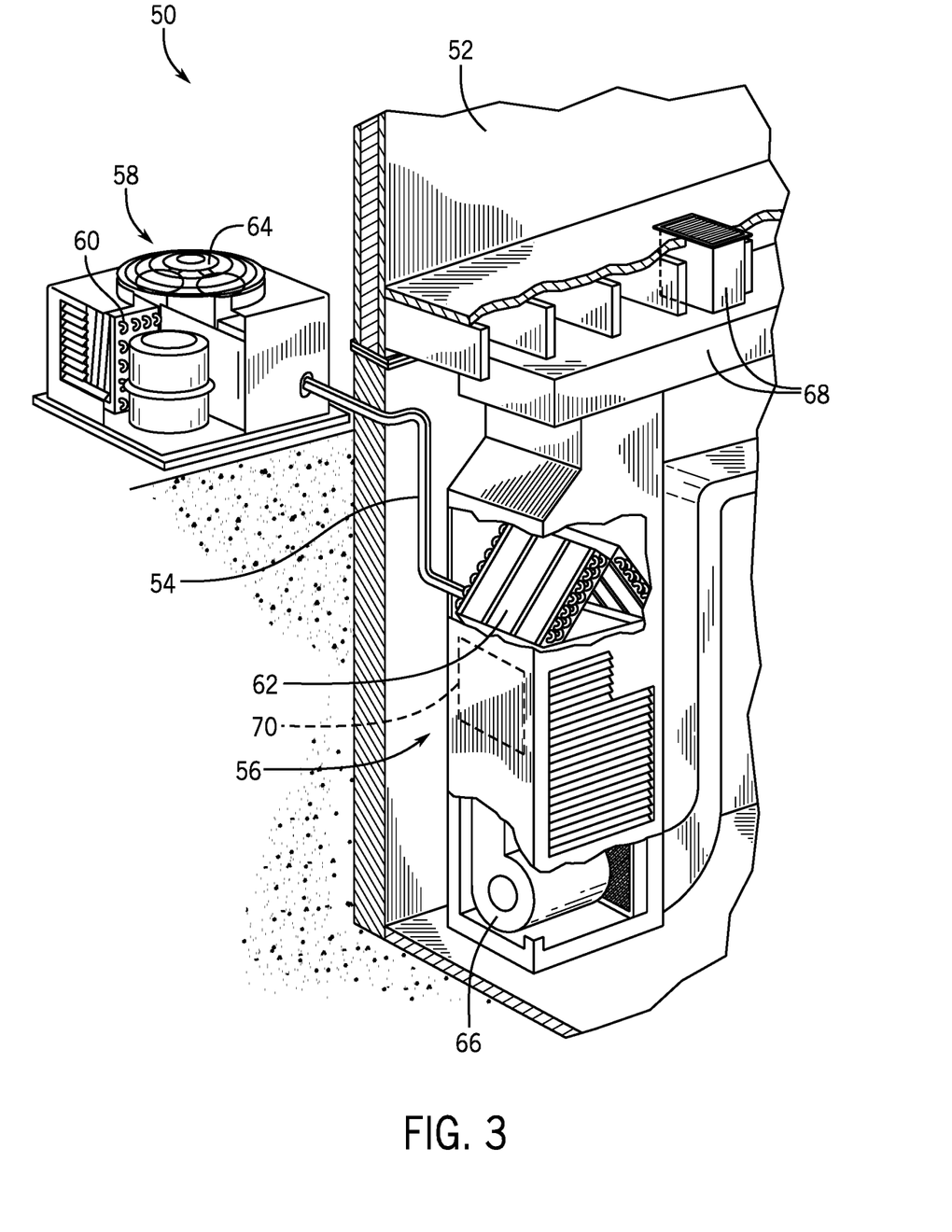
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
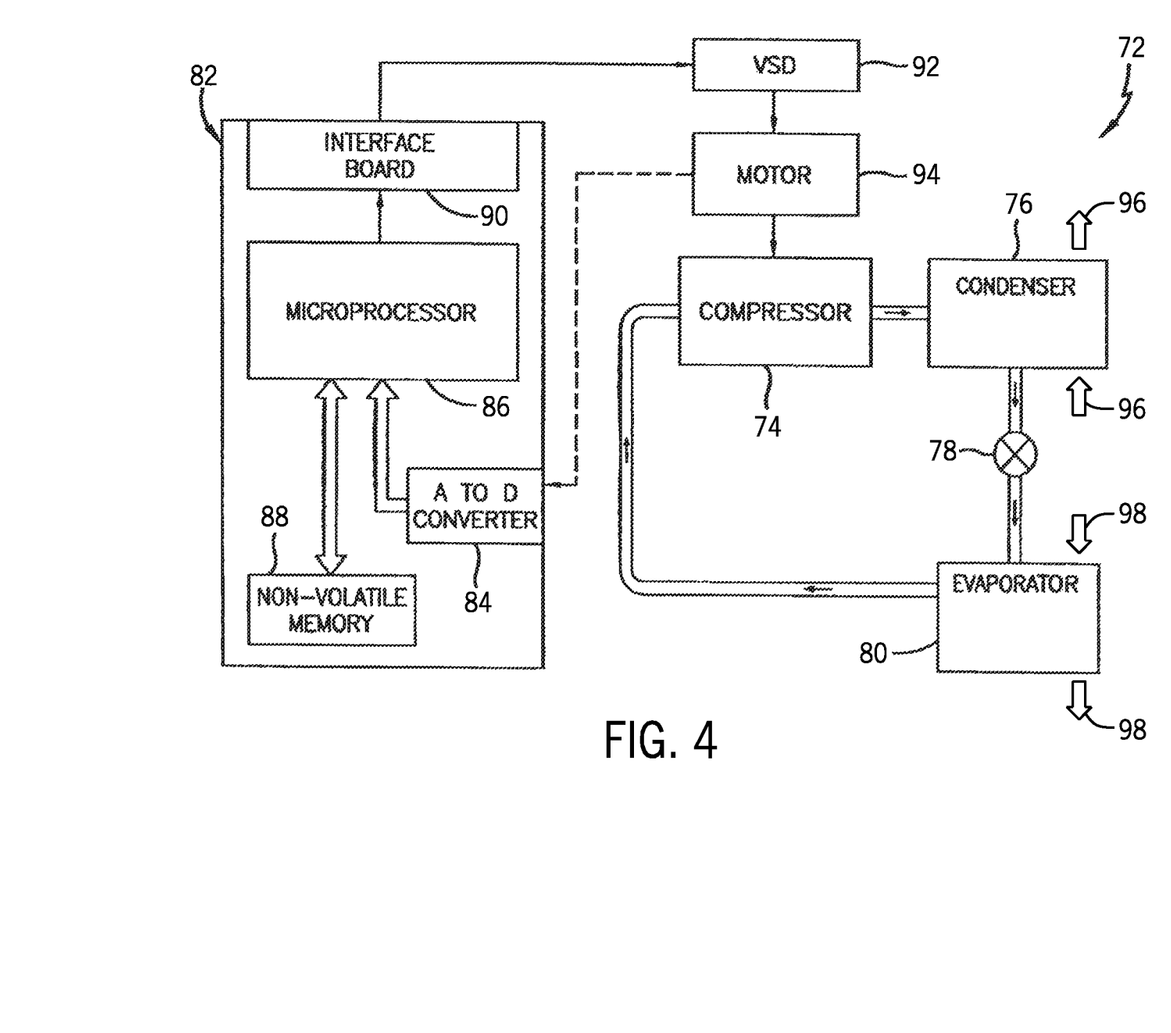
FIG. 4 is a schematic of an embodiment of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a nonvolatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
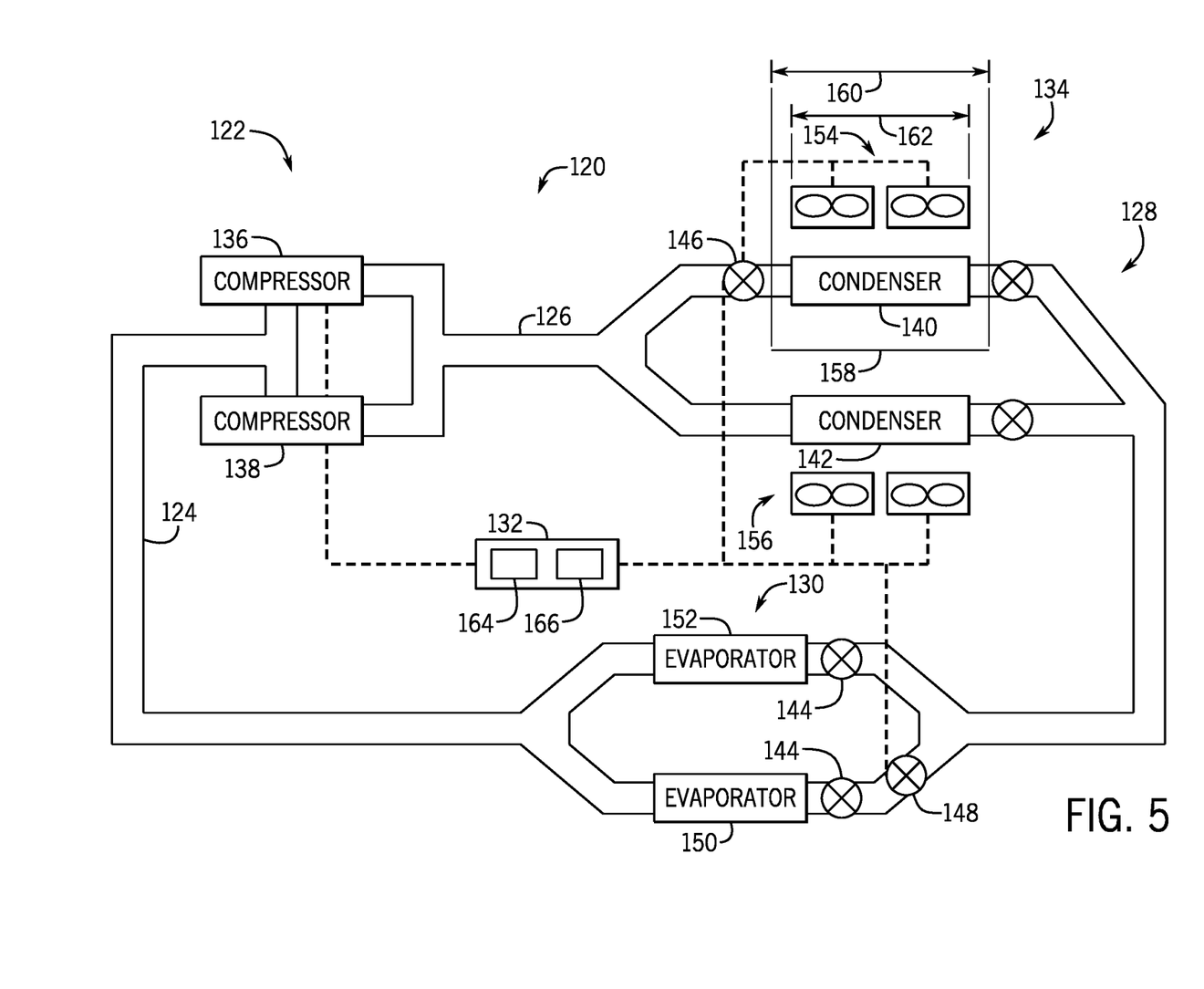
FIG. 5 is a schematic of an embodiment of an HVAC system, in accordance with an aspect of the present disclosure.

FIG. 5 is a schematic of an embodiment of an HVAC system 120. As illustrated, the HVAC system 120 is a two pipe HVAC system. The term "two pipe" refers to an HVAC system where multiple compressors 122 receive refrigerant through a single return pipe or conduit 124 and supply refrigerant through a single supply pipe or conduit 126. A single return pipe 124 and a single supply pipe 126 enable the HVAC system 120 to include less piping and thus may reduce the overall cost of the system. However, when operating the HVAC system 120 at less than 100% capacity, in other words shutting down one or more of the compressors 122, the HVAC system 120 is unable to use the full capacity of downstream components such as the condensers 128 and evaporators 130. One or more of the condensers 128 and evaporators 130 may therefore be shut down/closed off and the refrigerant may be diverted away from those condensers 128 and evaporators 130 that are not operating. As will be described in detail below, the HVAC system 120 includes a controller 132 capable of controlling one or more valves to shut down one or more of the condensers 128 and evaporators 130. In addition to controlling the flow of refrigerant through one or more condensers 128 and one or more evaporators 130, the controller 132 is able to control operation of one or more fans 134 to reduce power consumption when one or more of the condensers 128 are not in use. This ability enables the HVAC system 120 to save energy when operating at less than 100% capacity and may therefore increase the IEER efficiency rating of the HVAC system 120.

The refrigeration loop of the HVAC system 120 begins with the compressors 122. As illustrated, the HVAC system 120 includes a first compressor 136 and a second compressor 138 that compress and drive refrigerant through the refrigeration loop. While two compressors 122 are shown, some embodiments may include additional compressors. After passing through the compressors 122, the refrigerant flows through the single supply pipe or conduit 126 to the condensers 128. In the condensers 128, the refrigerant rejects heat, enabling the refrigerant to condense and change from a gaseous to a liquid state. To facilitate heat rejection by the refrigerant in the condensers 128, the fans 134 draw/blow air across the condensers 128. As illustrated, the HVAC system 120 includes a first condenser 140 and a second condenser 142; however, the HVAC system 120 may include additional condensers 128. After passing through the condensers 128, the refrigerant flows to the evaporators 130. But before the refrigerant enters the evaporators 130, the refrigerant passes through thermal expansion valves (TXV) valves 144 which rapidly reduce the pressure and thus the temperature of the refrigerant. The cooled refrigerant then passes through the evaporators 130 where the refrigerant exchanges energy with a fluid, such as a supply air flow, flowing across the evaporators 130. After passing through the evaporators 130, the refrigerant enters the return pipe or conduit 124 which directs the refrigerant back to the compressors 122, thereby restarting the refrigeration loop.

As explained above, the HVAC system 120 may operate at less than full capacity. For example, the HVAC system 120 may operate at 75%, 50%, 25% capacity. In order to operate at these reduced capacities, either compressor 136 or 138 may be shutdown. In some embodiments, the controller 132 may alternate operation between the two compressors 136, 138 to use them more or less equally each time the HVAC system 120 operates at a reduced cooling capacity. Because a single compressor 122 is unable to move as much refrigerant through the HVAC system 120, the controller 132 diverts the refrigerant away from one of the condensers 128 and one of the evaporators 130. The controller 132 does this by controlling solenoid valves 146 and 148. As illustrated, by closing solenoid valve 146, the HVAC system 120 diverts refrigerant away from the condenser 140 and sends the refrigerant through only the condenser 142. Similarly, when the controller 132 closes the solenoid valve 148, the HVAC system 120 diverts refrigerant away from the evaporator 150 and sends the refrigerant through only the evaporator 152.

To facilitate heat transfer from the refrigerant as it flows through the condensers 128, the HVAC system 120 includes the fans 134 that draw air across the condensers 128. As the air flows across the condensers 128 heat is transferred from the refrigerant to the surrounding air. As illustrated, the condensers 140, 142 are serviced by respective fans 154, 156. For example, the condenser 140 may be serviced with one or more fans 154, and the condenser 142 may be serviced with one or more fans 156. In order to reduce power consumption when the HVAC system 120 is operating at a reduced capacity, such as less than 100%, the controller 132 turns off the fans 154 that draw air over the condenser 140. Because the condenser 140 does not receive refrigerant when the HVAC system 120 is operating at a reduced capacity, drawing air over the condenser 140 may waste power, and thus reduce the overall efficiency of the HVAC system 120. However, because the condenser 142 still receives refrigerant, the controller 132 still operates the fans 156 to draw air across the condenser 142.

As illustrated, the HVAC system 120 includes a baffle 158 that facilitates heat transfer from the condenser 142 when the condenser 140 is shutdown, the HVAC system 120 includes a baffle 158. The baffle 158 reduces and/or blocks airflow between the condensers 140, 142 and their respective fans 154, 156. Without the baffle 158, the air flow generated by the fans 156 may cause the fans 154 to rotate. If the fans 154 are able to rotate they may draw air away from condenser 142, thus increasing power consumption by the fans 156 that service the condenser 142. In other words, the fans 154 would have to work harder to maintain a desired amount of heat transfer from the refrigerant to the surrounding air through the condenser 142. The baffle 158 is therefore able to reduce/block fluid communication between the condensers 128, and thus focus or guide air drawn/blown by the fans 134 over respective condensers 128. Accordingly, by providing the baffle 158 and shutting down the fans 154 servicing the condenser 140, the HVAC system 120 is able to save energy when operating at less than 100% of its cooling capacity.

As illustrated, the baffle 158 defines a length 160 that is greater than a length 162 of the condensers 128 to reduce and/or block airflow between the condensers 128. However, in some embodiments, the length 160 of the baffle 158 may be equal to the length 162 of the condensers 128 to reduce and/or block airflow between the condensers 128.

The controller 132 may include a processor 164 and a memory 166 used in controlling the compressors 122, fans 134, and valves. In operation, the processor 164 executes software stored by the memory 166 to control the HVAC system 120. The processor 164 may include one or more multiple microprocessors, one or more "general-purpose" microprocessors, one or more special-purpose microprocessors, and/or one or more application specific integrated circuits (ASICS), or some combination thereof. For example, the processor 164 may include one or more reduced instruction set (RISC) processors.

The memory 166 may include a volatile memory, such as random access memory (RAM), and/or a nonvolatile memory, such as read-only memory (ROM). The memory 166 may store a variety of information and may be used for various purposes. For example, the memory 166 may store processor executable instructions, such as firmware or software, for the processor 164 to execute. The memory may include ROM, flash memory, a hard drive, or any other suitable optical, magnetic, or solid-state storage medium, or a combination thereof. The memory may store data, instructions, such as software or firmware for controlling the HVAC system 120, and any other suitable data.

Figure 6:
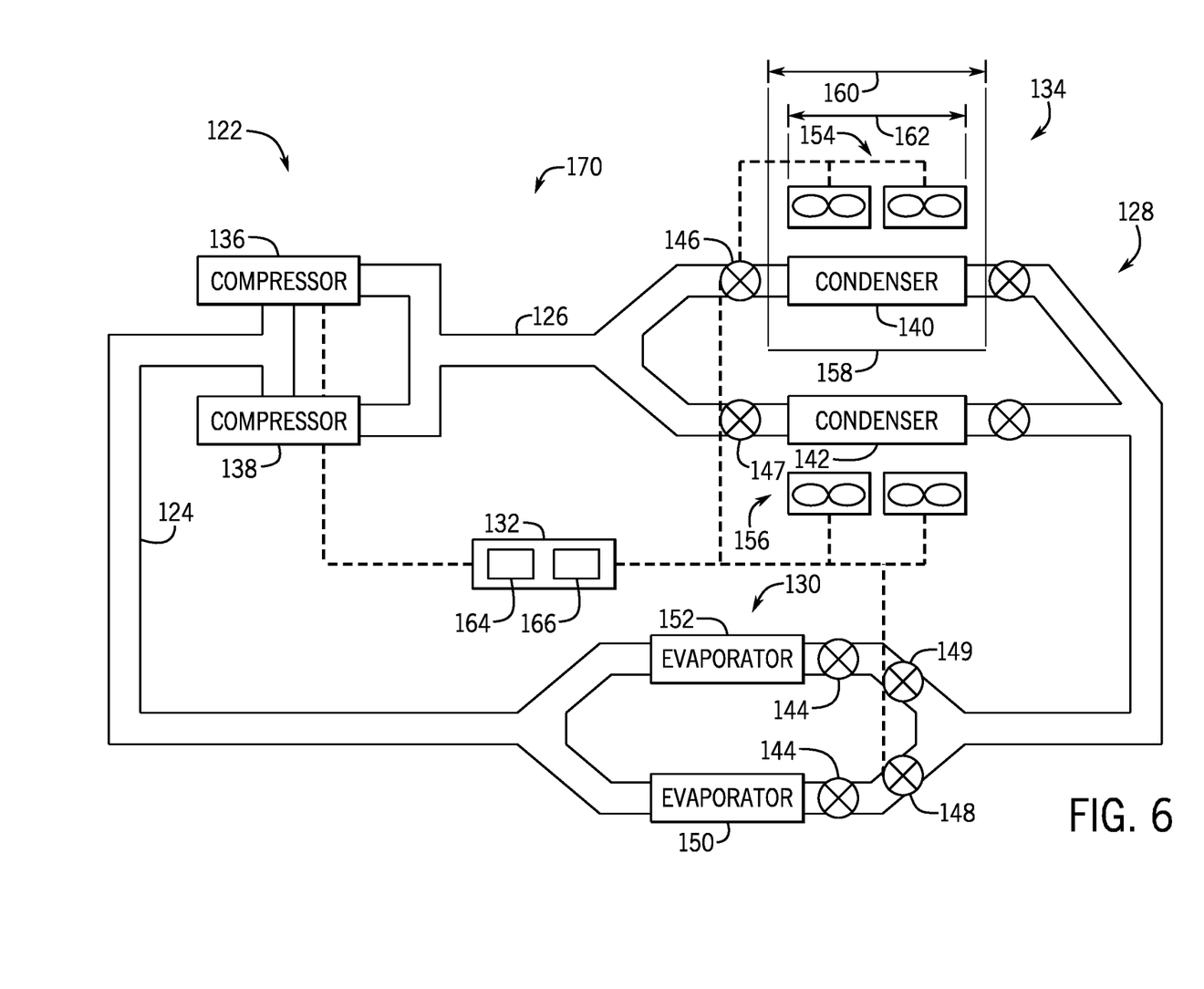
FIG. 6 is a schematic of an embodiment of an HVAC system, in accordance with an aspect of the present disclosure.

FIG. 6 is a schematic of an embodiment of an HVAC system 170. The HVAC system 170 is a two pipe HVAC system with the compressors 122 receiving refrigerant through the single return pipe or conduit 124 and supply refrigerant through the single supply pipe or conduit 126. When the HVAC system 170 operates at a reduced capacity, such as less than 100% capacity, the HVAC system 170 is unable to use the full capacity of downstream components such as the condensers 128 and evaporators 130. One or more of the condensers 128 and evaporators 130 may therefore be shut down/closed off and the refrigerant diverted away from those condensers 128 and evaporators 130 that are not operating. In order to alternate between the condensers 128 and evaporators 130, the HVAC system 170 includes a controller 132 that controls the flow of refrigerant with valves. The controller 132 also controls operation of one or more fans 134. By controlling operation of the fans 134, the HVAC system 170 is able to reduce power consumption when one or more of the condensers 128 are not in use. The HVAC system 170 is therefore able to save energy when operating at less than 100% of its cooling capacity.

The refrigeration loop of the HVAC system 170 begins with the compressors 122. While two compressors 136 and 138 are shown, in some embodiments the HVAC system 170 may include additional compressors 122. After passing through the compressors 122, the refrigerant flows through the single supply pipe or conduit 126 which carries the refrigerant to the condensers 128. In the condensers 128, the refrigerant rejects heat, condensing the refrigerant from a gaseous to a liquid state. To facilitate heat rejection, the fans 134 draw/blown air across the condensers 128. The HVAC system 170 includes the first condenser 140 and the second condenser 142; however, the HVAC system 170 may include additional condensers 128. After passing through the condensers 128, the refrigerant flows to the evaporators 130. But before entering the evaporators 130, the refrigerant passes through the TXV valves 144 which rapidly reduce the pressure and thus the temperature of the refrigerant. The cooler refrigerant then passes through the evaporators 130 where the refrigerant exchanges energy with the fluid flowing across the evaporators 130. After passing through the evaporators 130 the refrigerant enters the return pipe or conduit 124 which guides refrigerant back to the compressors 122 restarting the refrigeration loop.

As explained above, the HVAC system 170 may operate at less than full cooling capacity. In order to operate at these reduced capacities either compressor 136 or 138 may be shutdown. In some embodiments, the controller 132 may alternate between the two compressors 136, 138 each time the HVAC system 170 operates at a reduced cooling capacity, such as less than 100% of its cooling capacity. Because a single compressor 122 is unable to move as much refrigerant through the HVAC system 170, the controller 132 diverts the refrigerant away from one of the condensers 128 and evaporators 130. The controller 132 does this by controlling solenoid valves 146, 147, 148, and 149. As illustrated, by closing solenoid valve 146 and opening solenoid valve 147, the HVAC system 170 diverts refrigerant away from the condenser 140 and into the condenser 142. Likewise, if the controller 132 closes the solenoid valve 147 and opens solenoid valve 148, the refrigerant is diverted away from the condenser 142 and into the condenser 140. The controller 132 similarly controls the flow of refrigerant through the evaporators 130. For example, if the controller 132 closes solenoid valve 148 and opens solenoid valve 149, refrigerant is diverted away from the evaporator 150 and into the evaporator 152. Likewise, if the controller 132 closes the solenoid valve 149 and opens solenoid valve 148, the refrigerant is diverted away from the evaporator 152 and into evaporator 150. In some embodiments, the controller 132 may alternate between the condensers 128 and/or the evaporators 130 each time the HVAC system 170 operates at less than 100% of its cooling capacity.

To facilitate heat transfer from the refrigerant, the HVAC system 170 includes the fans 134 that draw air across the condensers 128. As the air flows across the condensers 128 heat is transferred from the refrigerant to the air. As illustrated, the condensers 140, 142 are serviced by respective fans 154, 156. The condenser 140 is serviced with one or more fans 154 while the condenser 142 is serviced with one or more fans 156. In order to reduce power consumption when the HVAC system 170 is operating at less than 100% of its cooling capacity, the controller 132 turns off the fans 134 servicing the unused condenser 128. For example, if the condenser 140 is not being used, then drawing air over the condenser 140 wastes power reducing the overall efficiency of the HVAC system 170. Accordingly, the controller 132 shuts down the fans 154 when the condenser 140 is not in use. Likewise, if condenser 142 is the unused condenser 128 then the controller 132 saves power by shutting down the fans 156.

In order to increase the heat transfer from the operating condenser 128, the HVAC system 170 includes a baffle 158. The baffle 158 reduces and/or blocks air flow between the condensers 140, 142 and their respective fans 154, 156. Without the baffle 158, the operating fans 134 may cause the non-operating fans 134 to spin backwards. If the non-operating fans 134 spin in the opposite direction they may draw air away from the operating condenser 128 increasing power consumption by the operating fans 134 as they work to maintain a desired amount of heat transfer from the operating condenser 128. Thus by providing the baffle 158, the HVAC system 170 may reduce power consumption by the fans 134 when operating at less than 100% of its cooling capacity.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vapor compression system, comprising:
a controller configured to switch between first and second modes of operation, wherein in the first mode of operation the controller is configured to turn off a first compressor while maintaining operation of a second compressor, to close a first valve to block a flow of a refrigerant through a first condenser to direct the refrigerant through a second condenser, and to turn off a first fan that directs airflow over the first condenser while continuously operating a second fan that directs airflow over the second condenser, in the second mode of operation the controller is configured to turn on the first compressor, to open the first valve to enable the flow of the refrigerant through the first condenser and the second condenser, and to turn on the first fan and the second fan, and wherein the first fan directs airflow over the first condenser and the second fan directs air over the second condenser.

2. The vapor compression system of claim 1, comprising a baffle, the baffle is configured to separate the first condenser and the first fan from the second condenser and the second fan.

3. The vapor compression system of claim 2, wherein in the first mode of operation the controller is configured to open a second valve to enable the flow of the refrigerant through the second condenser.

4. The vapor compression system of claim 3, wherein the controller is configured to close the second valve and open the first valve in a third mode of operation.

5. The vapor compression system of claim 4, wherein the controller is configured to turn off the second fan and turn on the first fan in the third mode of operation.

6. The vapor compression system of claim 5, wherein in the first and third modes of operation the controller is configured to operate the vapor compression system at a reduced capacity, and wherein in the second mode of operation the controller is configured to operate the vapor compression system at a full capacity.

7. The vapor compression system of claim 1, wherein the controller is configured to close a second valve to block the flow of the refrigerant through a first evaporator in the first mode of operation and to open the second valve to enable the flow of the refrigerant through the first evaporator in the second mode of operation.

* * * * *